Reissued May 13, 1947

Re. 22,878

UNITED STATES PATENT OFFICE 22,878

WOOL TYPE FABRIC

William S. Nutter, Sanford, Maine, assignor to Goodall-Sanford, Inc., Sanford, Maine, a corporation of Maine No Drawing. Original No. 2,416,116, dated February 18, 1947, Serial No. 620,401, October 4, 1945. Application for reissue March 15, 1947, Serial No. 735,017

1 Claim. (Cl. 139—426)

Worsted and woolen fabrics have for many years been made according to a standard construction in which both the warp and filling yarns are two-ply, while the size and twist of the yarns and the number of ends and picks have been varied as required by the quality and weight per square yard desired.

It is the object of the present invention to produce a fabric which shall replace, be at least equal to, and in many respects superior to, any such standard fabric.

It is the further object of the invention to provide such a novel fabric to replace such a standard fabric at greatly reduced cost not only in the spinning, weaving, and other processes employed in the manufacture of the fabric, but in the lessened amount of wool fiber required.

A further object of the invention in the production of this novel fabric is to make use of a soft plastic as one component which acts to close the scaly construction of the wool fiber, reduce or eliminate fuzziness and roughness of the wool fiber, prevent felting, increases the tensile strength of the yarns above those of the standard and, by reason of the adhesive characteristic of the plastic constituent, minimizes fiber and yarn slippage.

The object of the invention is further, in connection with the plastic treatment employed, the use of single yarn as filling, reduce substantially the twist of the yarns employed, and substantially reduce the number of filling picks and warp ends.

The novel and superior character of the fabric of this invention will appear more fully from the accompanying description and will be particularly pointed out in the claim.

The invention as stated enables any standard wool fabric formed in the usual way with two-ply wool fiber, warps and filling ends, and having a given weight per square yard, to be replaced at greatly reduced cost and with superior qualities.

In the fabric of this invention the yarns employed are given a twist at least twenty-five per cent below the twist of the yarns in the standard fabric to be replaced and are then impregnated with a soft plastic. Various plastics may be used for this purpose and as an example the polymer of a derivative of acrylic acid, manufactured by Rohm and Haas, and the well known copolymerization of vinyl chloride and vinyl acetate, manufactured by the Carbide & Carbon Chemicals Corporation, have been satisfactory. The amount of plastic employed in this impregnation must be sufficient to equal the difference in the weight of the wool fiber employed in the standard fabric to be replaced and wool fiber employed in this novel fabric so that the finished fabric of this invention shall have the same weight per square yard as the standard.

This treatment or impregnation of the yarn with the soft plastic gives additional wearing qualities while retaining all the softness that slack spun yarns possess. It enables a single yarn to have the required strength of a two-ply yarn. It also is deposited under the scales of the wool fiber thus closing these scales, practically eliminating fuzziness and the roughing-up characteristic of wool fiber and producing a relatively smooth and straight fiber. But since the plastic has a certain amount of adhesive quality the slippage which would occur with an absolutely smooth straight fiber is avoided. At the same time the tensile strength of the yarns is substantially increased over those of the standard.

The yarn employed for the filling of the fabric of this invention is a single yarn having not more than seventy-five per cent of the twist of the yarn in the standard and the yarn employed for the warp is a two-ply yarn each ply of which has a twist similar to that of the filling yarn employed but is of half the size or twice the count of the filling yarn.

In the weaving of the fabric with these yarns at least twenty-five per cent less filling picks and at least twenty-five per cent less warp ends than in the standard are employed.

Fabrics manufactured in accordance with this invention are not only less expensive to manufacture both by reason of the lessened amount of wool fiber employed, but by reason of the reduction in cost of the textile processes employed. The fabrics are found to have superior qualities to those of the standard fabric, among others in increased strength and wear, ability to withstand washing without felting or shrinking or disturbing the proportions of garments into which the fabric is made.

Having thus described the invention, what is claimed as new and desired to be secured by Letters Patent is:

A novel fabric, to replace a standard wool fabric formed in the usual way with two-ply wool fiber warp and filling and having the same weight per square yard as said standard, consisting of yarns of wool fiber having at least twenty-five per cent less filling picks and at least twenty-five per cent less warp ends than in said standard, with the filling a single yarn having not more than seventy-five per cent of the twist of the yarn plies of the standard, with the warp a two-ply yarn the plies of which have a similar twist to, and half the size of, the single yarn, and in which the yarns are impregnated with a soft plastic in amount sufficient to equalize the weight of the fabric to that of the standard and acting to increase the tensile strength of the yarns above those of the standard, to smoothen the fibers and prevent felting and, by reason of the adhesive characteristic, to minimize fiber and yarn slippage.

WILLIAM S. NUTTER.